(12) United States Patent
Huang

(10) Patent No.: US 9,347,604 B2
(45) Date of Patent: May 24, 2016

(54) NESTABLE COLLAPSIBLE SUPPORT APPARATUS

(71) Applicant: HON HAI PRECISION INDUSTRY CO., LTD., New Taipei (TW)

(72) Inventor: Fu-Kuo Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/567,772

(22) Filed: Dec. 11, 2014

(65) Prior Publication Data

US 2016/0116106 A1    Apr. 28, 2016

(51) Int. Cl.
*F16M 11/00* (2006.01)
*F16M 11/38* (2006.01)
*H05K 5/00* (2006.01)
*H05K 5/02* (2006.01)

(52) U.S. Cl.
CPC ............ *F16M 11/38* (2013.01); *H05K 5/0086* (2013.01); *H05K 5/0204* (2013.01)

(58) Field of Classification Search
USPC ......... 248/454, 455, 457, 460, 461, 462, 463, 248/441.1, 442.2, 443, 444, 370, 371, 165, 248/166
See application file for complete search history.

(56) References Cited

U.S. PATENT DOCUMENTS

| 5,690,309 | A * | 11/1997 | Blum ................... | A47B 23/041 248/444 |
| 6,007,259 | A * | 12/1999 | Mori ..................... | F16M 11/20 248/168 |
| 7,684,694 | B2 * | 3/2010 | Fromm .................. | F16M 11/14 396/376 |
| 2002/0066837 | A1 * | 6/2002 | Dunbar ................ | A47B 19/002 248/122.1 |
| 2004/0188587 | A1 * | 9/2004 | Michell ................ | A47B 19/002 248/457 |
| 2006/0016945 | A1 * | 1/2006 | Taylor ................... | A47B 19/06 248/188.5 |

* cited by examiner

*Primary Examiner* — Steven Marsh
(74) *Attorney, Agent, or Firm* — Novak Druce Connolly Bove + Quigg LLP

(57) ABSTRACT

Nestable collapsible support apparatus includes a first member and a second member moveably attached to the first member. The second member includes a plurality of segments moveably attached each other. One of every two adjacent segments is slidable relative to every other two adjacent segments for allowing the second member to be in a collapsed position, where the second member is received in the first member. One of every two adjacent segments is rotatable relative to another every other two adjacent segments for allowing the second member to be in a extended position, where the second member supports an object.

19 Claims, 5 Drawing Sheets

NESTABLE COLLAPSIBLE SUPPORT APPARATUS

FIELD

The subject matter herein generally relates to a nestable collapsible support apparatus. The nestable collapsible support apparatus can be used to support an object, such as a tablet computer.

BACKGROUND

Tablet devices, such as tablet computers, are increasingly used by consumers due to their portability and ease of use. A user needs to support the tablet computer while performing word processing or for media purposes, such as playing games or viewing movies.

BRIEF DESCRIPTION OF THE DRAWINGS

Implementations of the present technology will now be described, by way of example only, with reference to the attached figures.

DETAILED DESCRIPTION

Figure 1:
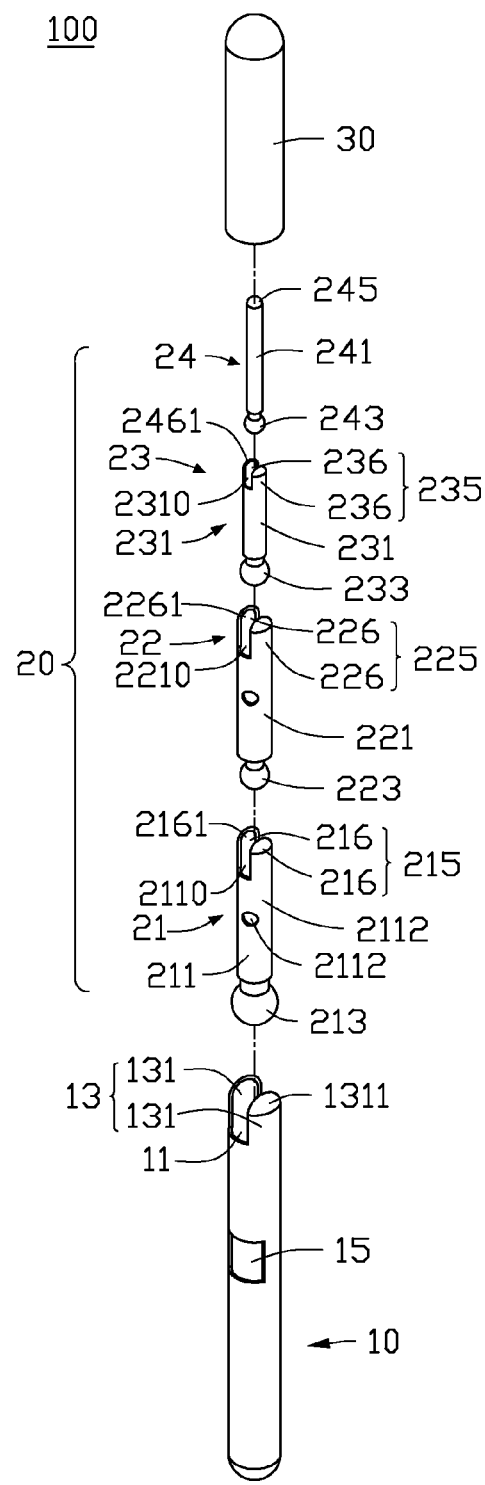
FIG. 1 is an exploded, isometric view of an embodiment of a nestable collapsible support apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a nestable collapsible support apparatus comprising a first member and a second member moveably attached to the first member. The second member comprises a plurality of segments moveably attached to each other. One of every two adjacent segments is slidable relative to another one of every two adjacent segments for allowing the second member to be located in a collapsed position, where the second member is received in the first member. One of every two adjacent segments is rotatable relative to another of every two adjacent segments for allowing the second member to be located on a extended position, where the second member supports an object.

Figure 2:
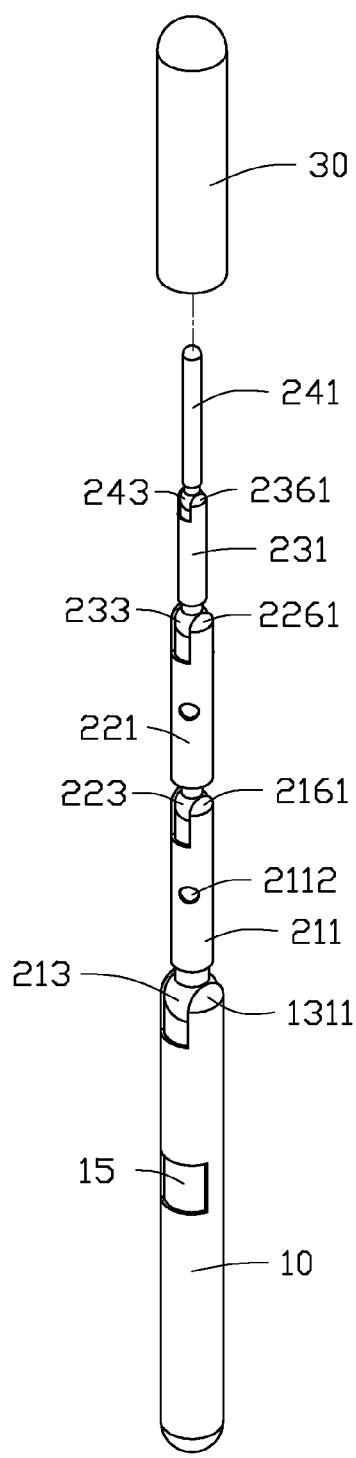
FIG. 2 is similar to FIG. 1, but a second member of the nestable collapsible support apparatus is assembled.

FIGS. 1-2 illustrate an embodiment of a nestable collapsible support apparatus 100. The nestable collapsible support apparatus 100 comprises a first member 10, a second member 20, and a sleeve 30. The nestable collapsible support apparatus 100 is used to support an object 200 (see FIG. 5). In at least one embodiment, the object 200 can be a tablet computer or a digital photo frame.

The first member 10 is hollow to define a defined interior space 11. A clipping portion 13 is located on the top portion of the first member 10 and comprises two clipping pieces 131 facing each other. Each clipping piece 131 comprises an elastic blocking portion 1311. A securing hole 15 is defined in the first member 10, communicating with the defined interior space 11.

The second member 20 comprises a plurality of segments, such as a first segment 21, a second segment 22, a third segment 23, and a fourth segment 24. In at least one embodiment, the plurality of segments can be a plurality of poles 21, such as a first pole, a second pole, a third pole, a fourth pole.

The first segment 21 comprises a first main body 211, a first rotating portion 213 located on a first end of the first main body 211, and a first clamping portion 215 located on a second end of the first main body 211. The first rotating portion 213 is substantially globular, and a diameter of the first rotating portion 213 is less than a width of the defined interior space 11 and is greater than a width between the two clipping pieces 13. A diameter of the first main body 211 is less than the width of the defined interior space 11 for being received in the defined interior space 11. A first accommodating hole 2110 and a mounting hole 2112 are defined in the first main body 211. The first clamping portion 215 comprises two first clamping pieces 216 facing each other. A first deformable limiting portion 2161 is located on each first clamping piece 216.

The second segment 22 comprises a second main body 221, a second rotating portion 223 located on a first end of the second main body 221, a second clamping portion 225 located on a second end of the second main body 221. The second rotating portion 223 is substantially globular, and a diameter of the second rotating portion 223 is less than a width of the first accommodating hole 2110 and is greater than a width between the two first limiting pieces 2161. The second main body 221 is hollow defining a second accommodating hole 2210. The second clamping portion 225 comprises two second clamping pieces 226 facing each other. A second limiting portion 2261, which is deformable, is located on each second clamping piece 226.

The third segment 23 comprises a third main body 231, a third rotating portion 233 located on a first end of the third main body 231, a third clamping portion 235 located on a second end of the third main body 231. The third rotating portion 233 is substantially globular, and a diameter of the third rotating portion 233 is less than a width of the second accommodating hole 2210 and is greater than a width between the two second limiting pieces 2261. A diameter of the third main body 231 is less than the width of the second accommodating hole 2210 allowing accommodation in the second accommodating hole 2210. The third main body 231 is hollow defining a third accommodating hole 2310. The third rotating portion 233 and the second clamping portion 225 can be together received in the securing hole 15. The third clamping portion 235 comprises two third clamping pieces 236 facing each other. A third deformable limiting portion 2361 is located on each third clamping piece 236.

The fourth segment 24 comprises a fourth main body 241, a fourth rotating portion 243 located on a first end of the fourth main body 241, a fourth clamping portion 245 located on a second end of the fourth main body 241. The fourth rotating portion 243 is substantially globular, and a diameter of the fourth rotating portion 243 is less than a width of the third accommodating hole 2310 and is greater than a width between the two third limiting pieces 2361. A diameter of the fourth main body 241 is less than the width of the third accommodating hole 2310 allowing accommodation in the third accommodating hole 2310. The fourth clamping portion 245 can be engaged in the mounting hole 2112.

The sleeve 30 is substantially a hollow container and can be sleeved on the first member 10; thereby receiving the second member 20.

Figure 3:
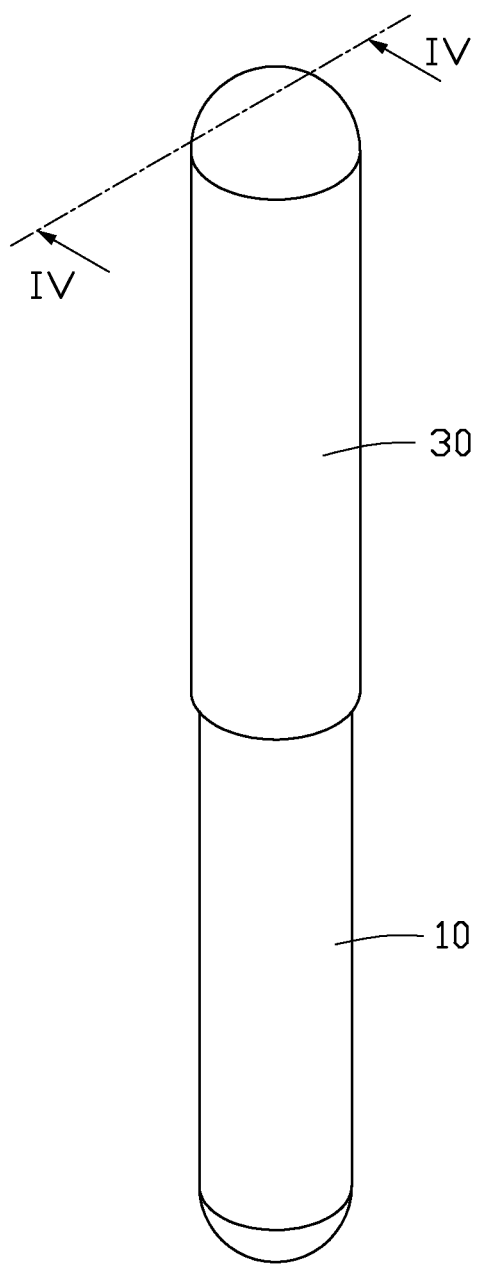
FIG. 3 is an assembled view of the nestable collapsible support apparatus of FIG. 1, and the second member is in a collapsed position.

FIGS. 2-3 illustrate in assembly of the nestable collapsible support apparatus 100, the two third limiting portions 2361 is deformed in opposite directions for allowing the fourth rotating portion 243 to be located between the two third limiting portions 2361. The two limiting portions 2361 are released, and the fourth rotating portion 243 is clipped with the third clamping portion 235. Thus, the fourth segment 24 can be moveably coupled with the third segment 23. Similar to the fourth segment 24, the third segment 23 can be moveably coupled with the second segment 22, the second segment 22 can be moveably coupled with the first segment 21, and the first segment 21 can be moveably coupled with the first member 10.

Figure 4:
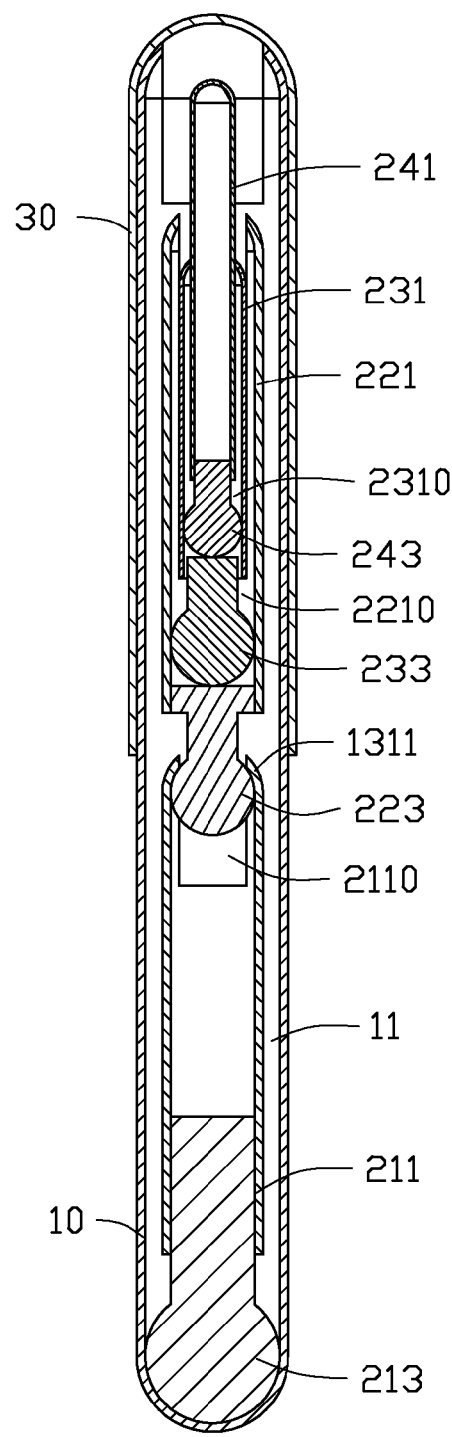
FIG. 4 is a cross-sectional view of FIG. 3, taken along a line IV-IV.

FIG. 4 illustrates the nestable collapsible support apparatus 100 not being used; the fourth segment 24 is slid relative to the third segment 23 to be received in the third accommodating hole 2310. The third segment 23 is slid relative to the second segment 22 to be received in the second accommodating hole 2210. The first segment 21 is slid relative to the first member 20 to be received in the defined interior space 11. Therefore, the second member 20 can be received in the defined interior space 11, and the sleeve 30 is sleeved on the first member 10. At this time, the nestable collapsible support apparatus 100 is substantially pen-shaped, and the second member 20 is in a collapsed position. In at least one embodiment, the nestable collapsible support apparatus 100 can be a touch pen, and when the second member 20 is located on the collapsed position, the nestable collapsible support apparatus 100 can be used to support the object 200 while in operation.

Figure 5:
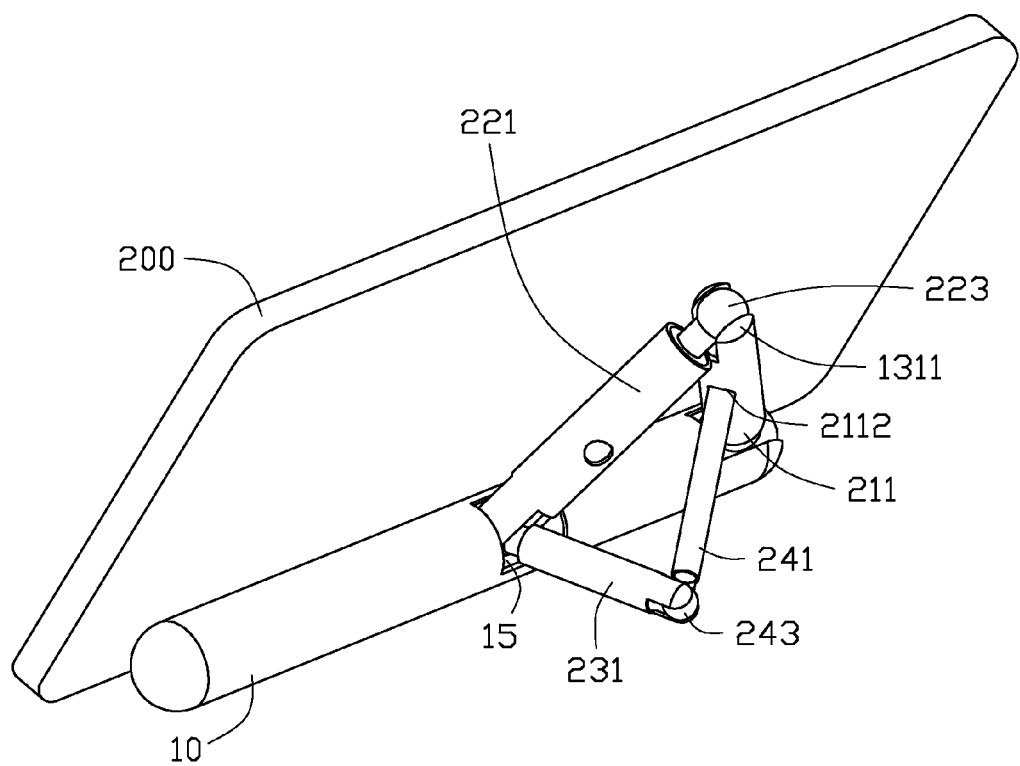
FIG. 5 is an isometric view of the nestable collapsible support apparatus of FIG. 1, but the second member is in an extended position.

FIG. 5 illustrates the nestable collapsible support apparatus 100 being used; the fourth segment 24 extends out of the third accommodating hole 2310 until the fourth rotating portion 243 clips with the two third limiting portions 2361. The third segment 23 extends out of the second accommodating hole 2210 until the third rotating portion 233 clips with the two second limiting portions 2261. The first segment 21 extends out of the defined interior space 11 until the first rotating portion 213 clips with the two blocking portions 1311. The first segment 21 is rotated about the first rotating portion 213 relative to the first member 10, the second segment 22 is rotated about the second rotating portion 223 relative to the first segment 21, the third segment 23 is rotated about the third rotating portion 233 relative to the second segment 22, and the fourth segment 24 is rotated about the fourth rotating portion 243 relative to the third segment 23, The third rotating portion 233 and the second clamping portion 225 are together engaged in the securing hole 15, and the fourth clamping portion 245 is engaged in the mounting hole 2112. At this time, the second member 20 is in a extended position; the first member 10, the third segment 23 and the fourth segment 24 are supported on a supporting surface, and the first segment 21 and the second segment 22 support the object 200.

The embodiments shown and described above are only examples. Many details are often found in the art such as the other features of a nestable collapsible support apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A nestable collapsible support apparatus comprising:
   a first member; and
   a second member moveably attached to the first member; the second member comprising a plurality of segments moveably attached to each other, one of every two adjacent segments being slidable relative to another of every two adjacent segments for allowing the second member to be in a collapsed position, where the second member is received in the first member, and one of every two adjacent segments being rotatable relative to another of every two adjacent segments for allowing the second member to be in an extended position, whereby the second member supports an object;
   wherein each segment comprises a rotating portion and a clamping portion, and the rotating portion of one of every two adjacent segments is moveably engaged with the clamping portion of another of every two adjacent segments.

2. The nestable collapsible support apparatus of claim 1, wherein the second member comprises a first segment moveably attached to the first member, a second segment moveably attached to the first segment, a third segment moveably attached to the second segment, and a fourth segment moveably attached to the third segment, when the second member is located in the extended position, the first segment extends out of the first member, the second segment and the third segment are secured to the first segment, and the fourth segment is secured to the first segment.

3. The nestable collapsible support apparatus of claim 2, wherein the first member defines a securing hole for engaging the second segment and the third segment, and the first member defines a mounting hole for engaging the first segment.

4. The nestable collapsible support apparatus of claim 2, wherein when the second member is located in the collapsed position, the fourth segment is received in the third segment, the third segment is received in the second segment, and the first segment is received in the first member.

5. The nestable collapsible support apparatus of claim 1, wherein the first member defines a defined interior space, two clipping pieces are located on the first member, the rotating portion of one of the plurality of segments is substantially globular, and a diameter of rotating portion is less than a width of the defined interior space but greater than a width between the two clipping pieces.

6. The nestable collapsible support apparatus of claim 1, further comprising a sleeve, wherein the sleeve is sleeved on the first member when the second member is located on the collapsed position for prevent the second member extending out of the first member.

7. The nestable collapsible support apparatus of claim 6, wherein when the sleeve is sleeved on the first member, the nestable collapsible support apparatus is substantially a pen-shaped.

8. The nestable collapsible support apparatus of claim 1, wherein a length of each of the plurality of segments is different, and a length of one of every two adjacent segments is greater than a length of another of every two adjacent segments.

9. The nestable collapsible support apparatus of claim 1, wherein the object is a tablet personal computer or a digital photo frame.

10. A nestable collapsible support apparatus comprising:
a first member defining a defined interior space; and
a second member moveably received in the defined interior space of the first member; the second member comprising a plurality of segments moveably attached to each other,
wherein each of the plurality of segments is movable relative to the first member to extend out of the defined interior space for supporting an object; each segment comprises a rotating portion and a clamping portion, and the rotating portion of one of every two adjacent segments is moveably engaged with the clamping portion of another of every two adjacent segments.

11. The nestable collapsible support apparatus of claim 10, wherein one of every two adjacent segments being slidable relative to another of every two adjacent segments for allowing the second member to be in a collapsed position, where the second member is received in the first member, and one of every two adjacent segments being rotatable relative to another of every two adjacent segments for allowing the second member to be in an extended position, whereby the second member supports an object.

12. The nestable collapsible support apparatus of claim 11, wherein the second member comprises a first segment moveably attached to the first member, a second segment moveably attached to the first segment, a third segment moveably attached to the second segment, and a fourth segment moveably attached to the third segment, when the second member is located in the extended position, the first segment extends out of the first member, the second segment and the third segment are secured to the first segment, and the fourth segment is secured to the first segment.

13. The nestable collapsible support apparatus of claim 12, wherein the first member defines a securing hole for engaging the second segment and the third segment, and the first member defines a mounting hole for engaging the first segment.

14. The nestable collapsible support apparatus of claim 12, wherein when the second member is located in the collapsed position, the fourth segment is received in the third segment, the third segment is received in the second segment, and the first segment is received in the first member.

15. The nestable collapsible support apparatus of claim 10, wherein two clipping pieces are located on the first member, the rotating portion of one of the plurality of segments is substantially globular, and a diameter of rotating portion is less than a width of the defined interior space but greater than a width between the two clipping pieces.

16. The nestable collapsible support apparatus of claim 11, further comprising a sleeve, wherein the sleeve is sleeved on the first member when the second member is located on the collapsed position for prevent the second member extending out of the first member.

17. The nestable collapsible support apparatus of claim 10, wherein a length of each of the plurality of segments is different, and a length of one of every two adjacent segments is greater than a length of another of every two adjacent segments.

18. A nestable collapsible support apparatus comprising:
a first member with an open end and a defined interior space communicating with the open end; and
a plurality of segments slidably collapsible into the defined interior space of the first member;
wherein, the first member is rotatably attached to one of the plurality of segments, multiple segments of the plurality of segments are rotatably attached to two of the plurality of segments and an end segment of the plurality of segments is rotatably attached to one of the plurality of segments;
wherein, when in a collapsed position, the plurality of segments is stored within the defined space of the first member; and
wherein, in an extended position the plurality of segments is linearly withdrawn from the first member with the end member furthest from the first member; and
wherein, the first member and the plurality of segments are moveable into one or more support positions.

19. The nestable collapsible support apparatus of claim 18, wherein each segment comprises a rotating portion and a clamping portion, and the rotating portion of one of every two adjacent segments is moveably engaged with the clamping portion of another of every two adjacent segments.

* * * * *